S. B. SCHENCK AND K. A. SIMMON.
SYSTEM OF CONTROL.
APPLICATION FILED SEPT. 5, 1916.
1,330,554.
Patented Feb. 10, 1920.
3 SHEETS—SHEET 1.
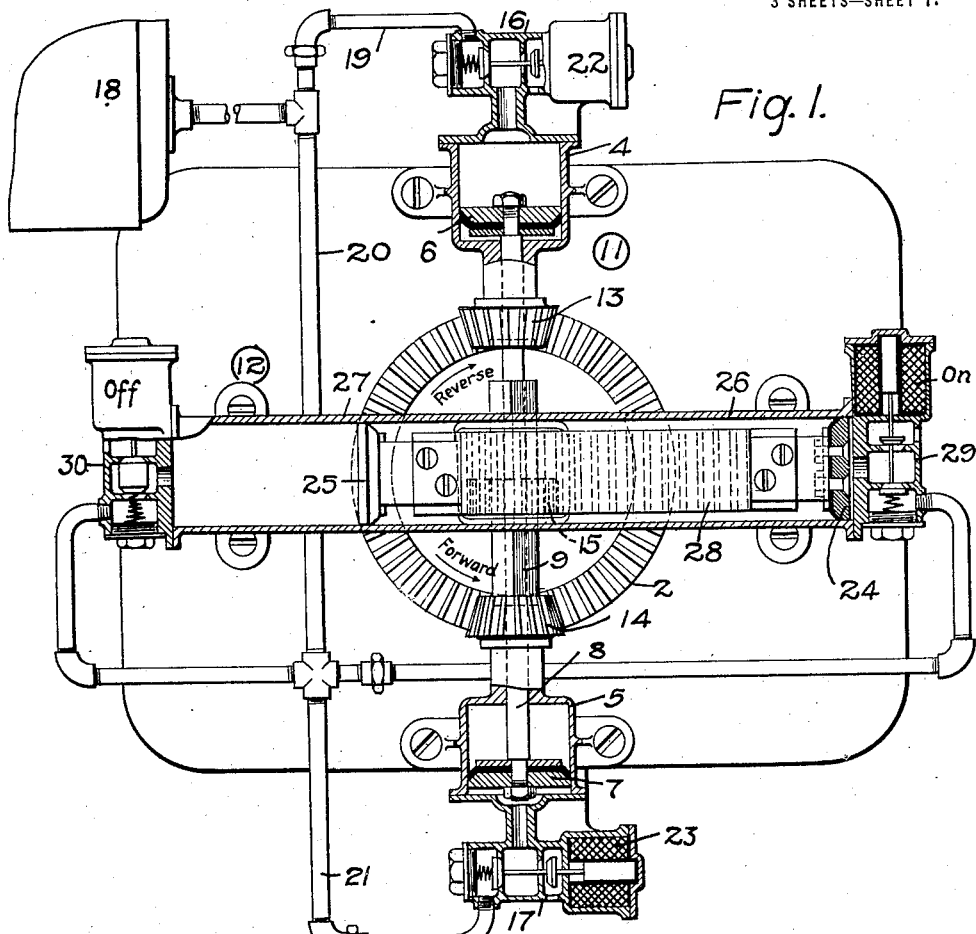
Fig. 1.
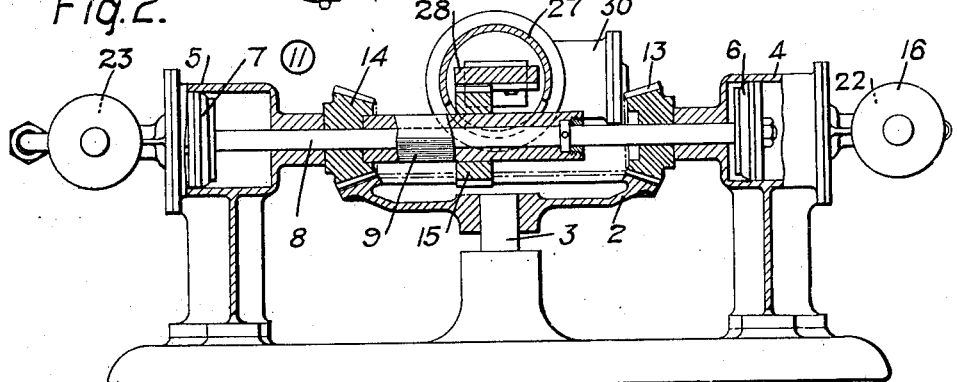
Fig. 2.
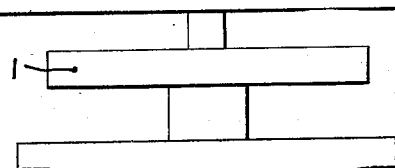
WITNESSES:
R. J. Cidge.
W. R. Coley
INVENTORS
Samuel B. Schenck &
Karl A. Simmon.
BY
Wesley G. Carr
ATTORNEY S. B. SCHENCK AND K. A. SIMMON.
SYSTEM OF CONTROL.
APPLICATION FILED SEPT. 5, 1916.
1,330,554.
Patented Feb. 10, 1920.
3 SHEETS—SHEET 2.
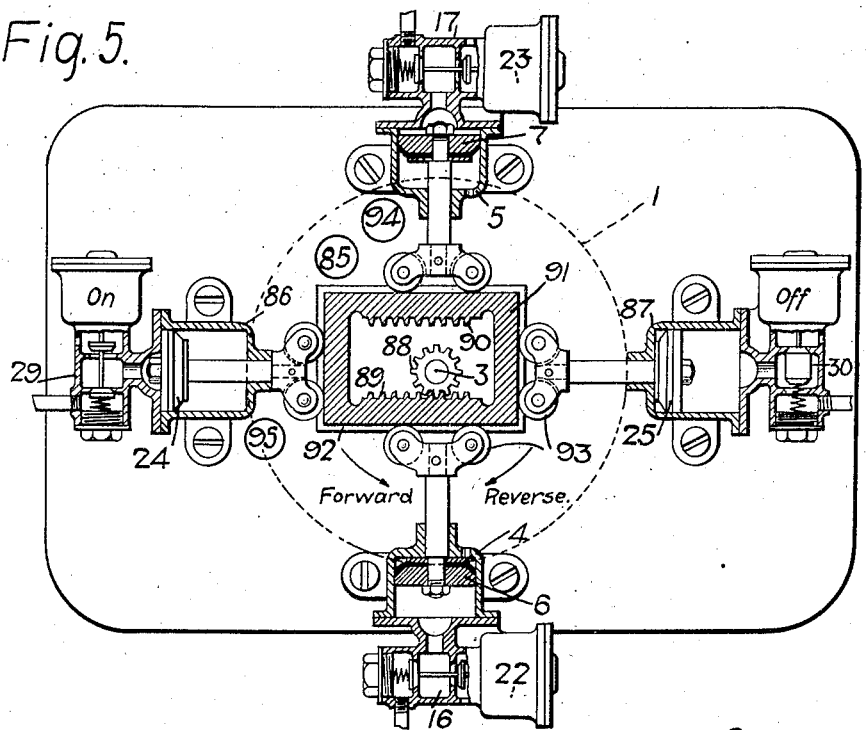
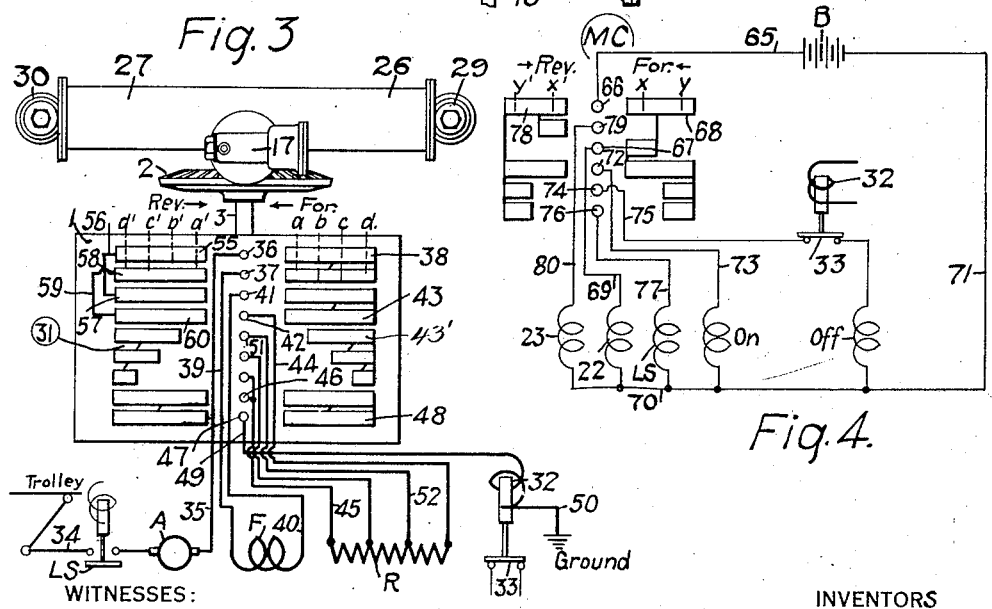
WITNESSES:
INVENTORS
Samuel B. Schenck &
Karl A. Simmon.
BY
ATTORNEY S. B. SCHENCK AND K. A. SIMMON.
SYSTEM OF CONTROL.
APPLICATION FILED SEPT. 5, 1916.
1,330,554.
Patented Feb. 10, 1920.
3 SHEETS—SHEET 3.
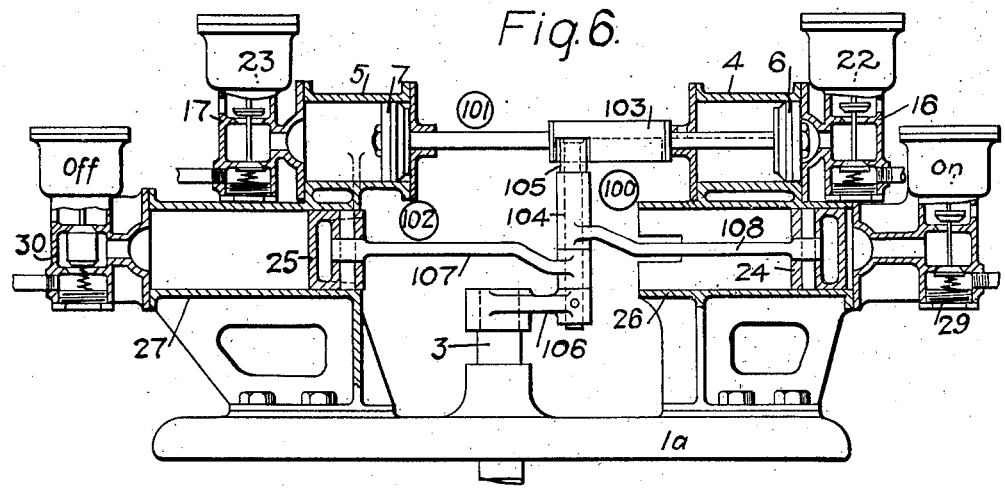
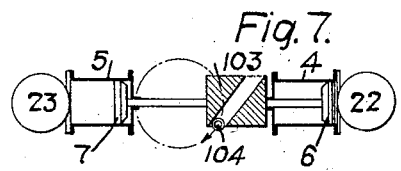
Reverse Position
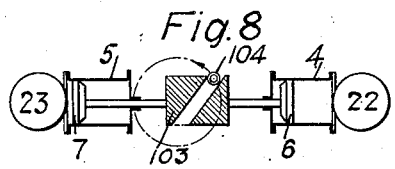
Forward Position
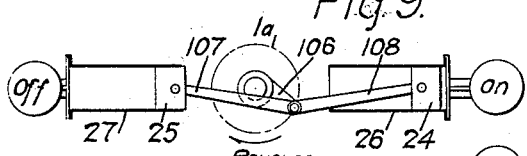
Reverse
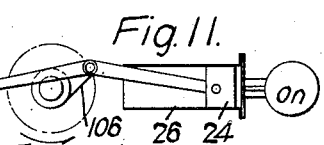
Forward
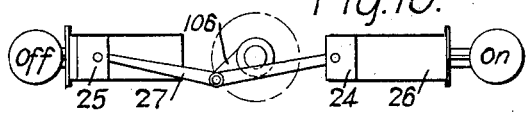
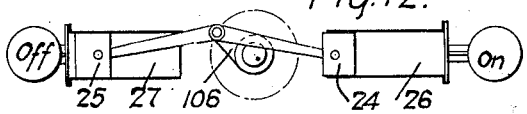
WITNESSES:
INVENTORS
Samuel B. Schenck &
Karl A. Simmon.
BY
ATTORNEY

UNITED STATES PATENT OFFICE.

SAMUEL B. SCHENCK, OF WILKINSBURG, AND KARL A. SIMMON, OF EDGEWOOD PARK, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

1,330,554.     Specification of Letters Patent.     Patented Feb. 10, 1920.

Application filed September 5, 1916. Serial No. 118,315.

*To all whom it may concern:*

Be it known that we, SAMUEL B. SCHENCK, a citizen of the United States, and a resident of Wilkinsburg, in the county of Allegheny and State of Pennsylvania, and KARL A. SIMMON, a citizen of the United States, and a resident of Edgewood Park, in the county of Allegheny and State of Pennsylvania, have invented a new and useful Improvement in Systems of Control, of which the following is a specification.

Our invention relates to systems of control and control apparatus for dynamo-electric machines and especially to the control of electric railway motors and the like.

In the prior art, it has been customary, in many electric railway systems, to provide a main controlling device, usually of the drum form, for governing the main-circuit connections of "series-parallel" or other control systems, with particular regard to the insertion and exclusion of a variable resistor. A second controlling device, independently actuated but electrically connected to the main control drum, has been utilized for reversing the connections of the main field windings with respect to the armatures.

It is the object of our present invention to provide a relatively simple and inexpensive system of control embodying a single controlling device, preferably of the drum type, for effecting operation of the machines to be governed in the one or the other direction, according as the control drum is moved in a corresponding direction from an intermediate or neutral position. Thus the customary reversing switch is unnecessary and a relatively compact and simple control apparatus governs the entire main-circuit connections.

More specifically stated, it is the object of our invention to provide several novel types of operating mechanisms for a drum controller or other member to be actuated, whereby a predetermined step-by-step movement of the drum in the one or the other direction may be simply and readily effected according to the relative positions of a plurality of coöperative actuating members.

Our invention may best be understood by reference to the accompanying drawings wherein Figure 1 is a plan view with parts shown in section, of control apparatus constructed in accordance with our invention; Fig. 2 is a view chiefly in section but partially in side elevation, of a portion of the control apparatus that is shown in Fig. 1; Fig. 3 is a diagrammatic view of the main circuits of a system of control adapted to employ our control apparatus; Fig. 4 is a diagrammatic view of an auxiliary governing system to be used in conjunction with the main system that is illustrated in Fig. 3; Fig. 5 is a plan view, similar to Fig. 1, of a modified form of apparatus constructed in accordance with the present invention; Fig. 6 is a view partially in side elevation and partially in section, of a further modification of our novel control apparatus; and Figs. 7 to 12, inclusive, are diagrammatic views serving to illustrate the operation of the apparatus that is shown in Fig. 6.

Referring to Fig. 1 and Fig. 2 of the drawing, the apparatus shown comprises a control drum 1 or other member to be actuated in opposite directions from an intermediate or neutral position, as clearly set forth in Fig. 3; a bevel gear wheel or annular rack member 2 that is suitably secured to the operating shaft 3 of the control drum; an electrically-controlled, fluid-pressure-actuated device 11 and a second actuating device 12 of a similar type for co-acting with the actuating device 11, under conditions to be described, to effect movement of the control drum in the one or the other direction from its intermediate position.

The actuating device 11 comprises a plurality of operating cylinders 4 and 5 within which pistons 6 and 7 are respectively adapted to travel and are rigidly connected by a piston stem or rod 8 having a central loosely-mounted member 9 of a suitable length, that is square in cross-section, whereas the rod is preferable cylindrical and of a diameter that is less than the dimension of one side of the square member. The purpose of such shape of the rod parts is that the one or the other of a pair of bevel gear members 13 and 14 will be rigidly associated with the square member 9 of the rod to actively mesh with the corresponding portion of the annular rack 2 while the other bevel-gear member will loosely rotate upon the associated cylindrical portion of the piston rod 8. The particular bevel-gear member that is operative is dependent upon the position of the pistons, which are actuated to their respective extreme positions in a manner to be described.

The square member 9 is suitably mounted upon the piston rod 8 to allow free rotative, but no longitudinal, movement, as clearly shown in Fig. 2, whereby the rotative movement of a spur gear wheel or pinion 15 that is rigidly secured to the middle of the square member 9, is not transmitted to the pistons 6 and 7, thus effecting an economy in the necessary operating energy for the other actuating device 12, as hereinafter more fully set forth.

The operating cylinders 4 and 5 are severally provided with valve members 16 and 17 of a familiar type that are normally closed to effect communication of the cylinders with the atmosphere and to prevent the admission of fluid under pressure from any suitable source, such as a tank or reservoir 18 through a plurality of pipes or passages 19, and 20 and 21, respectively. Actuating coils 22 and 23 are provided for the respective valve members to independently effect movement of the valves to their opposite positions.

The operation of the actuating device 11 may be briefly described as follows: Upon energization of the actuating coil 23 from any suitable source, as more fully described in connection with Fig. 4, the piston 7 will be moved from the illustrated position to the other extreme position by reason of the admission of fluid pressure to the cylinder 5 to cause unbalanced pressure conditions on the outer faces of the respective pistons. Under such conditions, the square member 9 of the piston rod becomes disengaged from the bevel-gear member 14 and moves into operative relation with the other bevel-gear member 13. To effect a return movement of the actuating device 11 to the illustrated position, the other actuating coil 22 is energized to admit fluid pressure to the corresponding cylinder and thus actuate the piston member in accordance with the reversed unbalanced-pressure conditions, in which case, the bevel-gear member 14 again engages the square member 9 of the piston rod, as illustrated.

It will be noted that longitudinal movement of the bevel-gear members 13 and 14 on the rod 8 in an outward direction is prevented by the abutting contact of the respective cylinders 4 and 5, while inward movement of the gear members is precluded by the meshing tapered teeth thereof and of the annular rack 2.

The other actuating device 12 is located at substantially right angles to the actuating device 11 and comprises a pair of pistons 24 and 25 which travel within suitable operating cylinders 26 and 27 and are provided with a common piston rod or stem, the central portion of which constitutes a relatively wide rack member 28 that is adapted to mesh with the spur gear member 15 and thus effect a rotative movement of the square member 9 of the piston rod 8 in accordance with the movement of the actuating device 12.

The operating cylinder 26 is provided with a valve member 29 of the same type as that described in connection with the actuating device 11 and which has an actuating coil "On", whereas the other operating cylinder 27 is provided with a different type of valve member 30 that is normally open to admit fluid pressure from the source 18 through suitable pipes or passages to the cylinder 27, and, when actuated to its closed position by the energization of its actuating coil "Off", fluid-pressure is exhausted through the valve member to the atmosphere.

Assuming that the actuating device 12 occupies the illustrated position wherein the pistons 24 and 25 are biased to one extreme position by reason of the existing unbalanced-pressure conditions, the operation of the device may be effected as follows: By simultaneously energizing the actuating coils of the valve members 29 and 30, fluid pressure is exhausted from the cylinder 27 and is admitted to the other cylinder 26, thus reversing the normal unbalanced fluid-pressure conditions and effecting a movement of the pistons toward the left, from the position shown in the drawing. Such movement may be arrested at any time by merely deënergizing the actuating coil "Off", whereby fluid-pressure is immediately admitted to the cylinder 27 and a balanced condition of fluid pressure in the respective cylinders obtains. To effect a return movement of the piston member to the illustrated position, the two actuating coils are simultaneously deënergized, whereupon the initial unbalanced-pressure conditions again obtain in the cylinders and the desired movement is, consequently, effected.

Assuming that the respective piston members occupy the relative positions shown wherein the bevel-gear member 14 is rigidly secured to the square member 9 of the piston rod 8 to operatively engage the annular rack member 2 and wherein the spur gear member or pinion 15 engages the side of the straight rack member 28 that is nearest to the observer, the operation of the combined actuating device 11 and 12 may be set forth as follows: Upon simultaneous energization of the actuating coils of the valve members 29 and 30, movement of the corresponding piston member toward the left begins, in accordance with the previously described operation. The pinion 15 and the square member 9 together with the rigidly associated bevel gear member 14 are rotatably moved, thereby effecting a corresponding movement of the annular rack member 2 and of the control drum 1 in the direction indicated by the arrow marked "Forward".

Movement of the control drum to its final operative position in the selected direction is then accomplished, in the manner previously described, by suitably manipulating the members of the actuating device 12. Return movement of the control drum toward the illustrated position may be effected by deënergizing the actuating coils "On" and "Off", as hereinbefore set forth.

When it is desired to actuate the control drum in the opposite direction from its intermediate position to effect reversed rotation of the dynamo-electric machine to be governed, as fully set forth in connection with Fig. 3, the actuating coil 23 of the actuating device 11 is energized to cause movement of the corresponding piston member to its other extreme position, wherein the bevel-gear member 14 becomes disengaged from the square member 9 of the piston rod 8 and the other bevel-gear member 13 is rigidly connected to the square member, while the pinion 15 engages the opposite side of the rack 28. Upon operation of the actuating device 12, in the manner previously recited, the control drum 1 will be rotated in the opposite direction, indicated by the arrow marked "Reverse", from that initially taken, by reason of the active coöperation between the annular rack member 2 and the bevel gear member 13 which is now rigidly connected to the square member 9 of the rod.

The selected movement of the control drum is thus effected by an actuation of the device 12 in the same direction and dependent upon the previously chosen position of the other actuating device 11.

Reference may now be had to Fig. 3, wherein the system shown comprises a pair of suitable supply-circuit conductors respectively marked "Trolley" and "Ground;" a dynamo-electric machine having an armature A and a reversible field winding F of the series type; a "line switch" LS; a main-circuit variable resistor R; the controlling device 1 of the drum type that is actuated in accordance with the operation of the mechanism previously described; and a limit switch 32 of a familiar type for governing through the agency of auxiliary contact members 33, certain auxiliary circuit connections to be described, in accordance with the value of the main-circuit current.

The control device 1 is shown as adapted to occupy an intermediate position marked "Off", a plurality of operative positions $a$ to $d$, inclusive, when operated in one direction that corresponds to "forward" rotation of the armature A, and a plurality of corresponding positions $a'$ to $d'$ inclusive, when operated in the opposite direction that corresponds to reversed rotation of the armature A. It will be understood that the particular type of system that is governed by the controlling device 1, or the number of operative positions selected, is immaterial to our present invention, and other devices may be employed in connection with various types of systems and with any desired number of operative positions. For example, the two portions of the drum may be used for acceleration and regeneration, respectively.

Referring now to Fig. 4, the auxiliary system shown comprises the various actuating coils of the actuating devices 11 and 12 and of the line switch LS, the auxiliary contact members 33 of the limit switch 32 and a suitable source of energy, such as a battery B, for energizing the various actuating coils through a suitable master controller MC that is adapted to occupy an "off" position, a plurality of operative positions $x$ and $y$ that correspond to forward motor operation and a plurality of similar positions $x'$ and $y'$ that correspond to reversed operation.

It will be understood that, if desired, the customary combination of separate master controller and master reverser may be utilized for the respective purposes of controlling the actuating coils of the operating device 12 and of the line switch LS, and of controlling the actuating coils of the operating device 11, but we prefer to employ a single controller that is analogously constructed to the main controlling device 31, for governing the system.

Assuming that it is desired to effect acceleration of the main machine with the various pieces of control apparatus occupying the illustrated positions, the operation of the system may be set forth as follows: Upon movement of the master controller MC to its initial forward position $x$, one circuit is completed from the positive terminal of the battery B through conductor 65, control fingers 66 and 67, which are bridged by contact segment 68, conductor 69, the actuating coil 22 of the actuating device 11 and conductors 70 and 71 to the negative battery terminal. In this way, it is insured that the actuating device 11 shall occupy its proper position to effect the desired forward operation before the control drum 1 is actuated. The circuit of the actuating coil 22 is broken when the controller is moved to the next position $y$.

A further circuit is completed, in position $x$ of the master controller, from the contact segment 68 through control finger 72, conductor 73, and the actuating coil "On" of the actuating device 12 to the negative conductor 70.

When the master controller is moved to its second operative position $y$, one circuit is completed from the contact segment 68 through control finger 74, conductor 75, the auxiliary contact members 33 of the limit switch 32 in its lower position, and the actuating coil "Off" of the actuating device 12 to the negative conductor 70.

Simultaneously, a further circuit is completed from the contact segment 68 through control finger 76, conductor 77 and the actuating coil of the line switch LS to the negative conductor 70.

The simultaneous closure of the actuating coils "On" and "Off" thus effects a movement of the main control drum 1 to its initial position $a$.

Referring now to Fig 3 the main circuit, thus completed, is established from the trolley through conductor 34, the switch LS, the armature A, conductor 35, control fingers 36 and 37, which are bridged by contact segment 38 of the main control drum, conductor 39, the field winding F, conductor 40, control fingers 41 and 42, which are bridged by contact segment 43, conductor 44, the entire accelerating resistor R, conductor 45, control fingers 46 and 47, which are bridged by contact segment 48, conductor 49, the series actuating coil 32 of the limit switch and conductor 50 to the negative supply-circuit conductor Ground.

The flow of current incident to the initial closure of the main-motor circuit causes the limit switch 32 to occupy its upper position and thus interrupt the energizing circuit of the actuating coil "Off". The actuating device 12 is thus maintained in a predetermined position that corresponds to the position $a$ of the main controlling device 1, in accordance with the previously described operation, and movement of the controller drum is effected only after the limit switch has again dropped to its lower position to complete the circuit of the actuating coil "Off." Thus, the main control drum is forwardly actuated in a step-by-step manner, dependent upon the position of the limit switch 32, that is, upon the value of current traversing the main-motor circuit.

As soon as the main control drum 1 is moved to its second operative position $b$, the contact segment 43′ engages control finger 51, whence circuit is completed through conductor 52 to an intermediate point of the accelerating resistor R, thus short-circuiting a predetermined portion of the resistor, in accordance with familiar practice, to effect a certain degree of motor acceleration.

Similar short-circuiting operation of the remaining sections of the resistor R is effected by the step-by-step movement of the main control drum 1 to its successive positions $c$ and $d$, as will be understood, and, thus, the motor is directly connected to the supply circuit.

Assuming that it is desired to effect rotation of the armature A in the reversed direction which corresponds to reversed movement of the main control drum, from the intermediate position "Off," it being understood that such operation will, of course, be effected only when the motor is at rest, the master controller MC may be actuated to its initial reversed position $x'$, whereby one circuit is completed from the positively-energized control finger 66 through contact segment 78, control finger 79, conductor 80 and the actuating coil 23 of the actuating device 11 to the negative conductor 70. Thus, the actuating device 11 is moved to its other extreme position in accordance with the previously described operation, wherein the bevel-gear member 13 actively engages the annular rack member 2.

The remaining operation of the master controller MC conforms exactly to the previously described operation of energizing the actuating coils "On" and "Off," and the actuating coil of the switch LS.

The main control drum 1 is thus actuated to its initial reverse position $a'$ as soon as the actuating coils "On" and "Off" are energized, whereby a circuit (see Fig. 3) is completed through the armature A in the same direction as previously set forth, conductor 35, control finger 36, contact segment 55, conductor 56, contact segment 57, and control finger 41 of the control drum, conductor 40, the field winding F, through which current flows in the reversed direction from that hereinbefore described, conductor 39, control finger 37, contact segment 58, conductor 59, contact segment 60 and control finger 42 of the main control drum, whence circuit is completed through entire accelerating resistor R, as previously mentioned.

The remaining operation of the control drum 1 is identical with that set forth in connection with forward vehicle operation, it being understood that the reversal of the field winding F, with respect to the armature A, causes a reversed rotation of the motor.

Referring now to Fig. 5, the apparatus shown comprises the control drum 1 or other device to be actuated, the various operating cylinders and corresponding pistons similar to those described in connection with Fig. 1, and a novel operating mechanism 85 that is interposed between the various piston members.

The operating mechanism in question comprises a pinion member 88 that is secured to the operating shaft 3 of the control drum 1 and is adapted to engage the one or the other of toothed inside face 89 and 90, respectively of a hollow parallelepipedical rack member 91 which is shown in cross section in Fig. 5. The rack member 91 is provided with a peripheral groove 92 within which are adapted to travel a plurality of sets of rollers 93 that are suitably secured to the various rods or stems of the respective pistons.

The rack member 91 is adapted to occupy the illustrated position wherein one inner face 89 engages the pinion 88, whenever the actuating device 94 occupies the position shown, but is adapted to effect the engagement of its other internal toothed face 90 with the pinion 88 when the pistons 6 and 7 occupy their other extreme positions, in accordance with the operation of the previously described actuating device 11.

When the rack member 91 occupies the illustrated position, therefore, a movement of the piston members 24 and 25, in accordance with the previously described operation of the actuating device 12 (corresponding to 95 in Fig. 5) will cause the control drum to move in the direction indicated by the arrow marked "Forward" to govern the main-circuit connections, as illustrated in Fig. 3 or for any other desired purpose.

To effect the reversed operation of the control drum 1 from its illustrated intermediate position, the actuating coil 23 of the device 94 is energized to cause the pistons 6 and 7 to occupy their other extreme positions, whereby the toothed inner face 90 of the rack member 91 engages the pinion 88 and movement of the other pistons, 24 and 25, as previously described, then effects an opposite rotation of the control drum in the direction indicated by the arrow marked "Reverse".

Referring to Fig. 6 the apparatus shown comprises a control drum 1ª or other device to be actuated, the several operating cylinders that correspond to the operating cylinders of the actuating devices 11 and 12, and a sliding-block mechanical connection or guide 100 that is located between the various pistons and the control drum.

In the present apparatus, the operating cylinders 4 and 5 of the actuating device 101 (corresponding to device 11 of Fig. 1) are disposed above the respective operating cylinders 25 and 24 of the other actuating device 102, the illustrated positions being chosen with due regard to the necessary operating clearances for the various moving parts. The rods or stems of the pistons 6 and 7 are connected by a diagonally-slotted block 103 (see also Fig. 7) within which an upwardly extending arm 104 which is preferably provided with a roller 105, is disposed, the lower end of the arm 104 being connected by a crank arm 106 to the operating shaft 3 of the control drum 1ª.

The oscillatable stems or rods 107 and 108 of the other pistons 25 and 24, respectively, are suitably pivotally mounted upon the upwardly projecting arm 104 to provide an appropriate operating means to transmit the movement of the pistons to the operating shaft of the control drum.

In Figs. 6 and 7 the pistons 6 and 7 are illustrated in the position that corresponds to the reversed operation of the main machine, and the crank arm 106 occupies a position such that the upwardly projecting arm 104 is located near the side adjacent the observer of the diagonally-slotted guiding-block member 103. Upon energization of the actuating coil 22 that corresponds to the cylinder 4, the piston 6 is moved toward the left to cause the crank member 106 to gradually approach its other extreme or forward position that is illustrated in Fig. 8, as the upwardly-projecting arm 104 travels toward the remote end of the diagonal slot. It will be understood that the opposite operation of the mechanism is effected when the pistons occupy the positions illustrated in Fig. 8, by energizing the actuating coil 23 to admit fluid-pressure to the cylinder 5.

Fig. 9 shows, diagrammatically, the relative positions of the pistons 24 and 25 of the operating device 102 when the crank arm 106 and, therefore, the control drum 1ª occupies a position that is suitable for beginning the "reverse" operation of the control drum. Actuation of the control drum through its successive reverse positions by manipulation of the device 102 may then be accomplished in the manner previously set forth in connection with Fig. 1. At the finish of the "reverse" operation the crank arm 106 and pistons 24 and 25 occupy the respective relative positions that are illustrated in Fig. 10.

It will be understood that, after the selected initial movement of the guiding-block 103 to the one or the other of its positions, no further movement thereof is effected by the operation of the actuating device 102, since the upwardly-extending arm 104 travels outside of the guiding-block 103, as indicated by the arrows in Figs. 7 and 8.

To effect "forward" movement of the control drum 1ª from the intermediate or "off" position, the pistons 6 and 7 of the actuating device 101 are moved to the extreme left position by the energization of the actuating coil 22, to admit fluid-pressure to the cylinder 4, whereupon the crank arm 106 occupies the position indicated in Fig. 11. The operation of the control drum through its successive positions may be effected by the previously described operation of the pistons of the actuating device 102, the crank arm 106 occupying the position illustrated in Fig. 12 at the finish of the "forward" operation.

It will be observed that the accurate length of the "off" position of the control drum 1ª is necessarily greater than that requisite in the other control drums 1 that are employed in connection with the operating mechanisms shown in Fig. 1 and Fig. 5, respectively. Otherwise, the control drum or other member to be actuated may be similar to that previously set forth.

It will be appreciated that other modifications of our controlling apparatus may be made without departing from the spirit and scope of our invention and we desire, therefore, that only such limitations shall be imposed as are indicated in the appended claims.

We claim as our invention:

1. The combination with a movable member, of operating means therefor embodying a plurality of independently actuated members extending transversely of each other and dependent upon their relative positions for collectively effecting movement of said movable member in different directions, and a single controlling means for said operating means.

2. The combination with a movable member, of operating means therefor embodying a plurality of mechanically co-acting members dependent upon their relative positions for effecting movement of said movable member in the one or the other direction, one of said plurality of members comprising means for intermittently causing the unbalancing of a normally balanced force.

3. The combination with a dynamo-electric machine and a control drum for effecting complete forward or reverse acceleration of said machine according as the drum is moved step-by-step in the one or the other direction from an intermediate inoperative position, of operating means for the drum embodying a plurality of movable members dependent upon their relative positions for effecting the selected movement of the drum.

4. The combination with a dynamo-electric machine and a control drum for effecting complete forward or reverse acceleration of said machine according as the drum is moved step-by-step in the one or the other direction from an intermediate inoperative position, of operating means for the drum embodying a plurality of mechanically co-acting members dependent upon their relative positions for effecting the selected movement of the drum.

5. The combination with a dynamo-electric machine and a control drum for effecting complete forward or reverse acceleration of said machine according as the drum is moved step-by-step in the one or the other direction from an intermediate inoperative position, of plural-position means adapted to initially occupy the one or the other of its positions, and means operative in the same direction to effect the selected movement of the drum dependent upon the position of said plural-position means.

6. The combination with a movable member, of power-actuated means adapted to initially occupy a selected position, other power-actuated means continuously operative in the same direction for thereupon effecting movement of said movable member in the one or the other direction dependent upon said selected position, and single means for governing both said power-actuated means.

7. The combination with a movable member, of electrically-controlled two-position means adapted to initially occupy the one or the other of its positions, other electrically-controlled multi-position means extending transversely of said two-position means for thereupon effecting movement of said movable member in the one or the other direction dependent upon the position of said two-position means, and a controller adapted to occupy a definite position corresponding to each position of said multi-position means.

8. The combination with a movable member, of a plurality of fluid-pressure actuated devices, a pair of normally closed valve members associated with one of said devices to individually effect movement thereof to the one or the other of its positions, a normally open and a normally closed valve to bias a second of said devices to a predetermined position, and means for reversing the positions of said normally open and said normally closed valve to effect movement of said movable member in the one or the other direction dependent upon the position of the first-mentioned device.

9. The combination with a dynamo-electric machine and a control drum for effecting complete forward and reverse acceleration of said machine according as the drum is moved step-by-step in the one or the other direction from an intermediate inoperative position, of power-actuated means adapted to initially occupy a selected position, and other power-actuated means for thereupon effecting movement of said drum in a direction dependent upon said selected position.

10. The combination with a dynamo-electric machine and a control drum for effecting complete forward and reverse acceleration of said machine according as the drum is moved step-by-step in the one or the other direction from an intermediate inoperative position, of electrically-controlled two-position means adapted to be fluid-operated to initially occupy the one or the other of its positions, and other electrically-controlled multi-position means adapted to be fluid-operated for thereupon effecting movement of said drum in a direction dependent upon the selected position of said two-position means.

11. The combination with a dynamo-electric machine and a control drum for effecting complete forward and reverse acceleration of said machine according as the drum is moved step-by-step in the one or the other direction from an intermediate inoperative position, of a plurality of fluid-pressure-actuated devices, a pair of normally closed valve members associated with one of said devices to individually effect movement thereof to the one or the other of its positions, a normally open and a normally closed valve to bias a second of said devices to a predetermined position, and means for reversing the position of said normally open and said normally closed valve to effect movement of said drum in the one or the other direction dependent upon the position of the first-named device.

12. The combination with a dynamo-electric machine and a control drum for effecting complete forward and reverse acceleration of said machine according as the drum is moved step-by-step in the one or the other direction from an intermediate inoperative position, of a plurality of fluid-pressure-actuated devices, a pair of normally closed valve members associated with one of said devices to individually effect movement thereof to the one or the other of its positions, a normally open and a normally closed valve to bias a second of said devices to a predetermined position, a rack member secured to said drum, a plurality of gear wheels respectively adapted to actively mesh with said rack member in accordance with the position of the first-named actuating device, another gear wheel rigidly associated with the first-named actuating device, and a rack member movable with the second-named actuating device and adapted to mesh with the said last gear wheel in all positions thereof.

13. The combination with a movable member, of operating means therefor embodying a plurality of independently actuated members adapted to be operated at right angles to each other for collectively effecting movement of said movable member in different directions, and a single controlling means for said operating means.

14. The combination with an annular rack member, of a plurality of alined gear wheels meshing with said rack member, a rod extending through said gear wheels and provided with a square intermediate section for operatively engaging the one or the other of said gear wheels, a pinion attached to said square section, a straight rack member meshing with said pinion, and independent means for effecting actuation of said rod and said straight rack member.

15. The combination with an annular rack member, of a plurality of alined gear wheels meshing with said rack member, movable means for operatively engaging either one of said gear wheels and for allowing the other gear wheel to run idly, means for actuating said movable means to such operative engagements, and means acting upon said movable means transversely to said actuating means for effecting rotative movement of said annular rack member.

In testimony whereof we have hereunto subscribed our names this 29th day of August, 1916.

SAMUEL B. SCHENCK.
KARL A. SIMMON.